J. Buckelew,
Spike and Nail.
Nº 2,771. Patented Sep. 3, 1842.
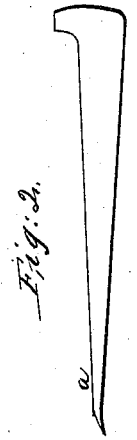
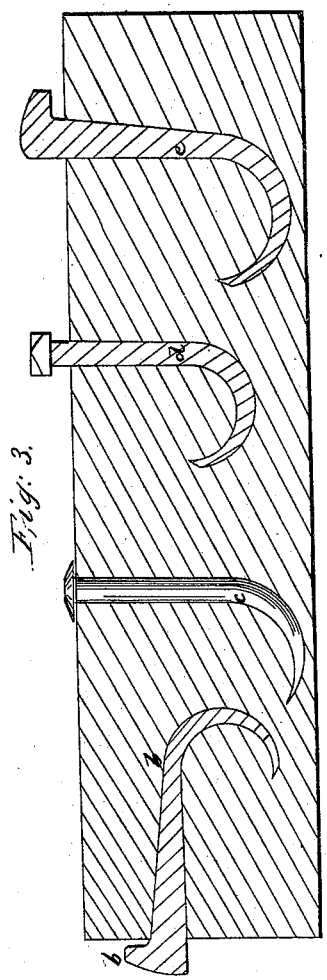
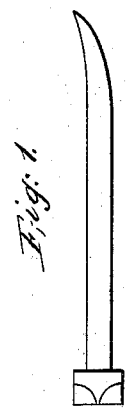

UNITED STATES PATENT OFFICE.

JAMES BUCKELEW, OF SPOTSWOOD, NEW JERSEY.

MANNER OF CLENCHING SPIKES, BRADS, AND NAILS.

Specification of Letters Patent No. 2,771, dated September 3, 1842.

*To all whom it may concern:*

Be it known that I, JAMES BUCKELEW, of Spotswood, in the county of Middlesex and State of New Jersey, have made an improvement in the manner of forming and of using spikes, brads, and nails of various kinds, so that they will effectually clench themselves when they are being driven into wood whether entering it with or across the grain and which I therefore denominate "self-clenching spikes and nails;" and I do hereby declare that the following is a full and exact description thereof.

To the lower, or entering, ends of my nails, or spikes, which I make flat, like a firmer, or chisel, I give a slope, or chamfer, resembling that ordinarily given to firmers, leaving them flat, or nearly so, on one side, and giving them a bevel on the other. In forming my spikes, brads, or nails, I usually make them of an equal width from head to point in one direction, and taper them, in any desired degree, in the opposite direction, but giving to them a slope, or bevel, at the lower end, as above stated. When they are intended to be driven into soft wood, the bevel, or bend, is to be greater than when they are to be driven into hard wood; and in those spikes which are stout in the shaft, it is best, in all cases, to give a bend to them, near to their lower ends, in the direction in which they are to bend in clenching themselves; this bend may be varied in amount according to the curvature which it is desired the spike, or nail, should acquire in the act of clenching. The chamfer, or bevel, may, in fact, be entirely omitted, and the tendency to clench be given, and governed, entirely by the bend given to them at the point. In using these spikes, or nails, a hole is to be bored into the wood into which they are to be driven, to such a depth as it is desired to drive them without their beginning to clench; and when driven beyond this point, the chamfer and bend, or the chamfer alone, or the bend alone, which they have previously received will cause them to curve around, and to clench themselves in the wood in any desired degree.

In the accompanying drawing, Figure 1, represents a spike of the ordinary kind which is curved, or bent, near to its lower end, preparatory to its being driven into the wood. Fig. 2, is a brad-headed spike which is chamfered at *a*, at its lower end, and is also bent in a slight degree to aid said chamfer in causing it to clench. Fig. 3, represents a piece of timber with several spikes driven into it.

*b, b,* is a brad-headed spike, similar to that shown in Fig. 2, which is represented as driven into the wood the end way of the grain, and clenched by the directing action of the chamfer and bend given to it before driving; *c, d,* and *e,* are other spikes driven into wood crosswise of the grain, and self-clenched, in the manner, and from the cause, above described. Spikes have been clenched by first driving a plate of iron into the timber, laterally, which would cause the point to turn up; but this plate cannot, in all cases, be inserted, is always troublesome, and imperfect in its action; and is rendered altogether unnecessary by my mode of procedure.

Having thus fully described the nature of my invention, and shown the means by which the same is to be carried into operation, what I claim therein as new, and desire to secure by Letters Patent, is—

The manner of using, the spikes, nails, or brads, which I denominate self-clenching and to which I give a determined amount of chamfer, or of bend, or of both combined, so that they shall begin to clench when driven into wood, either with, or across, the grain, the wood being bored for their first entrance, to the depth which it is desired they should reach without clenching, and there made to turn by the form given to the spike itself, without its being necessary to aid it by the insertion of a plate of iron, or any other analogous device.

JAMES BUCKELEW.

Witnesses:
 THOS. P. JONES,
 ADDISON L. DAVIS.